United States Patent [19]
Thompson

[11] Patent Number: 4,494,622
[45] Date of Patent: Jan. 22, 1985

[54] MOTORCYCLE POWER TRANSMISSION AND BRAKE ASSEMBLY

[76] Inventor: David L. Thompson, 12682 Oxford Dr., La Mirada, Calif. 90638

[21] Appl. No.: 416,370

[22] Filed: Sep. 9, 1982

Related U.S. Application Data

[63] Continuation-in-part of Ser. No. 222,335, Jan. 5, 1981, abandoned.

[51] Int. Cl.³ .............................................. B62L 1/00
[52] U.S. Cl. ..................................... 180/227; 180/231
[58] Field of Search ........................ 180/227, 230, 231

[56] References Cited

U.S. PATENT DOCUMENTS

| | | | |
|---|---|---|---|
| 1,143,793 | 6/1915 | Strand | 180/231 |
| 2,468,367 | 4/1949 | Holderness | 180/231 |
| 3,252,537 | 5/1966 | Tarran | 180/227 |
| 3,573,882 | 4/1971 | Van Winsen | 280/690 |
| 3,974,892 | 8/1976 | Bolger | 180/227 |

FOREIGN PATENT DOCUMENTS

| | | | |
|---|---|---|---|
| 2307695 | 11/1976 | France | 180/227 |
| 260474 | 11/1926 | United Kingdom | 180/227 |

Primary Examiner—Joseph F. Peters, Jr.
Assistant Examiner—Ross Weaver
Attorney, Agent, or Firm—Klein, Szekeres & Fischer

[57] ABSTRACT

A power transmission and brake assembly for motorcycles and like vehicles wherein a chain driven rear wheel is mounted on a swing arm, is disclosed. An idle sprocket and brake assembly including a first and a second idle sprocket and a brake member such as a brake disk is mounted to rotate about a pivot axle of the swing arm. First and second endless chains interconnect the idle sprocket assembly respectively with an output shaft mounted drive sprocket and a rear wheel sprocket. A brake engaging member, such as a pair of hydraulically actuated brake calipers, is fixedly connected directly or indirectly to the swing arm. The brake engaging member frictionally engages the brake member whenever braking of the chain driven wheel is desired. As a result, a force arises during braking which tends to push the rear wheel downward towards the road surface, and thereby increases the traction of the rear wheel.

18 Claims, 6 Drawing Figures

MOTORCYCLE POWER TRANSMISSION AND BRAKE ASSEMBLY

CROSS-REFERENCE TO RELATED APPLICATION

This is a continuation-in-part of application Ser. No. 222,335, filed Jan. 5, 1981, now abandoned.

BACKGROUND OF THE INVENTION

1. Field of the Invention

The present invention relates to an improved motorcycle power transmission and brake assembly, and more particularly to an improved motorcycle power transmission and brake assembly wherein a rear wheel of the motorcycle is driven and braked through an intermediary idle sprocket assembly.

2. Brief Description of the Prior Art

Conventional and most frequently utilized motorcycle drive or power transmission assemblies incorporate a drive sprocket, a rear wheel sprocket and an endless chain which interconnects the drive and rear wheel sprockets of the motorcycle. The drive sprocket is driven, usually through an intermediate transmission and clutch assembly, by the engine. The axle of the rear wheel of the motorcycle is mounted to a fork shaped elongated member, which is usually referred to as a swing arm. The swing arm is mounted to the frame of the motorcycle through a swing arm pivot axle so that the rear wheel axle is able to move on an arc relative to the frame. The swing arm is usually also connected to the frame through a pair of springs, shock absorbers or the like.

In traditional motorcycle construction either a brake drum or a brake disk is incorporated in, or a fixedly attached to the hub of the rear wheel. In the event a brake disk is used, a mechanically or hydraulically actuated caliper type device is caused to frictionally engage both sides of the disk whenever a braking action is desired.

As is well known in the motorcycle manufacturing and designing arts, mounting the rear wheel of a motorcycle on a pivotable swing arm is necessary in order to enable the rear wheel to move up and down as irregularities or bumps of the road surface are traversed by the motorcycle.

As is further well known in the motorcycle manufacturing arts, an inherent disadvantage of the above summarized motorcycle drive and brake system is that as the rear wheel axle moves up and down on an arc carried by the swing arm, a distance between the rear wheel sprocket and the drive sprocket changes. Therefore, the endless chain must be designed, and adjusted in tension to reasonably accommodate the above noted variations in the distance between the drive sprocket and the rear wheel sprocket. This can, however, be accomplished only with a limited degree of success. Consequently, as all motorcycle drivers know, broken chains, too tight chains, too loose chains, and the requirement for periodically readjusting the tension of the chains represent problems which continuously require attention by the motorcycle repairing industry.

An additional disadvantage of the conventional motorcycle drive and brake system construction is caused by the weight of the brake drum or brake disk which is incorporated in, or is fixedly attached to the hub of the rear wheel. As is well known by those skilled in the art, in order to improve the handling characteristics of a motorcycle, it is desirable to minimize unsprung weight. Yet the weight of the rear wheel brake drum or brake disk is undesirable, unsprung weight.

Still another disadvantage of conventional motorcycle drive and brake system construction is that during braking, the weight of the motorcycle (including the weight of its rider) tends to shift forward thereby decreasing the traction of the rear wheel on the road surface. Therefore, rear wheels of motorcycles have a marked tendency to "skid" during hard braking. Expressed in other words, in conventional motorcycles the forward shifting of the weight during braking occurs at the "least opportune" moment, precisely when increased traction of the rear wheel on the road surface would be desirable for effective braking and directional control of the motorcycle.

In order to overcome the first noted disadvantage of conventional motorcycle construction, namely the requirement for frequent adjustment of the drive chain of the motorcycle, the prior art has provided certain types of alternative power transmission constructions and add-on devices. These by-and-large eliminate, or more or less alleviate, the chain problems continuously troubling conventional motorcycles. U.S. Pat. No. 3,548,963, for example, describes a two-wheeled vehicle in the nature of a small portable motorcycle, wherein a pulley and an idler sprocket are mounted to rotate in unison about the swing arm pivot axle. The pulley is connected by a belt with a drive shaft of the engine and the idler sprocket is connected by a chain with the rear sprocket of the rear wheel. Similar constructions utilizing a double row idler sprocket are described in U.S. Pat. Nos. 3,974,892; 3,252,537; 2,468,367; 1,143,793, and in British Pat. No. 260,474 and French Pat. No. 2,307,695. An advantage of utilizing a double row or similar idle sprocket rotating about the swing arm pivot axle, as is described in the above-noted U.S. patents, is that the slack or tension of the drive chain is unaffected by the irregular up-and-down movement of the rear wheel axle.

U.S. Pat. No. 2,468,367 describes, in addition to the above noted double row sprocket or like idle sprocket assemblies, a brake drum which is mounted on the same axle with the double row sprocket assembly.

U.S. Pat. No. 4,034,821 describes a motorcycle drive system wherein a pair of idler sprockets are mounted to the frame, "pinching" the drive chain. These idle sprockets more or less automatically adjust the slack of the drive chain.

Additional disclosures relating to motorcycle chains and drive systems or the like are found in U.S. Pat. Nos. 4,039,200; 1,780,705; 3,722,612; 4,061,050, and 4,077,485.

The present invention represents a significant improvement over the above-noted prior art in that, in accordance with the present invention, slack or temporary overtightening of the chain and resulting chain failure is eliminated, the unsprung weight of the rear wheel of the motorcycle and of associated braking system is minimized, and traction of the rear wheel of the motorcycle is increased during braking.

SUMMARY OF THE INVENTION

It is an object of the present invention to provide a power transmission and brake system for a motorcycle or like chain driven vehicle wherein the tension of a drive chain is unaffected by up-and-down motion of the rear wheel in response to encountering bumps and irregularities in a road surface.

It is another object of the present invention to provide a power transmission and brake system for a motorcycle or like chain driven vehicle wherein the unsprung weight of the rear wheel of the vehicle is minimized.

It is still another object of the present invention to provide a power transmission and brake system for a motorcycle or like chain driven vehicle, wherein traction of the chain driven wheel is increased during braking of the chain driven wheel.

These and other objects and advantages are attained by a power transmission and brake system wherein an idle sprocket and brake assembly is mounted to rotate about a pivot axis of a swing arm which carries an axis of a rear wheel of the motorcycle or like chain driven vehicle. The idle sprocket and brake assembly is connected by a first endless chain with a drive sprocket rotated by the engine of the motorcycle, and by a second endless chain with a rear sprocket fixedly attached to the rear wheel. The idle sprocket and brake assembly includes a brake member, such as a brake disk, which rotates about the pivot axle of the swing arm. The brake member is fixedly connected with other rotating members of the idle sprocket and brake assembly. When braking is desired the brake member is engaged by a suitable brake engaging device, such as brake calipers, which are fixedly connected to the swing arm of the motorcycle. Thus, braking action is provided to the rear wheel through the idle sprocket and brake assembly and the second endless drive chain. Because the brake member such as the brake disk is not mounted on the rear wheel, the weight of the rear wheel is minimized. Furthermore, because of mounting the brake engaging device to the swing arm, during braking a force arises which pushes the braked rear wheel towards the road thereby increasing its traction.

The objects and features of the present invention are set forth in the appended claims. The present invention can be best understood by reference to the following description, taken in connection with the accompanying drawings in which like numerals indicate like parts.

DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
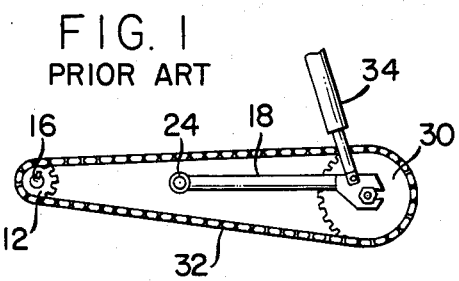
FIG. 1 is a schematic side view of a conventional motorcycle power transmission assembly of the prior art.
Figure 2:
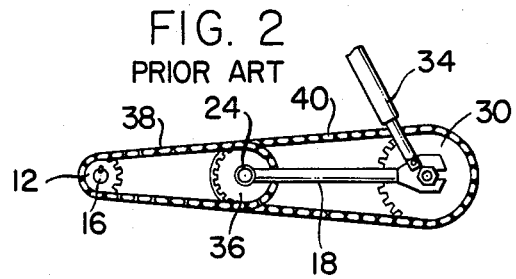
FIG. 2 is a schematic side view of a motorcycle power transmission assembly of the prior art, said assembly including a double row idle sprocket mounted to rotate about a pivot axle of a swing arm which carries a rear wheel sprocket.

With reference now to the schematic views of FIGS. 1 and 2, prior art motorcycle drive or power transmission assemblies are briefly described. More particularly, a conventional power transmission or drive assembly, shown on FIG. 1, includes a drive sprocket 12. The drive sprocket 12 is rotated, usually through an intermediate transmission and clutch assembly 14 by an output shaft 16 of an engine 17. The engine 17 and the transmission and clutch assembly 14 are schematically shown on FIG. 3. A swing arm 18 is mounted to a frame 20 of the motorcycle 22 on a swing arm pivot axle 24 and the swing arm 18 carries a rear wheel 26 which is shown on FIG. 3. An axle 28 of the rear wheel 26 has a rear wheel sprocket 30 fixedly attached thereto, and an endless chain 32 interconnects the drive sprocket 12 with the rear wheel sprocket 30. The swing arm 18 is also connected to the frame 20 by shock absorbers 34. Although it is not shown on FIGS. 1 and 2, in the prior art a brake drum or brake disk is fixedly attached to the rear wheel 26 so that the weight of the brake drum or brake disk adds to the unsprung weight of the rear wheel 26.

As it was explained in more detail in the introductory section of the present application for patent, an alternative drive or power transmission assembly of the prior art, such as the one schematically shown on FIG. 2, includes a double row idle sprocket 36 which is mounted to be rotatable about the swing arm pivot axle 24. A first endless chain 38 interconnects the drive sprocket 12 with the idle sprocket 36, and a second endless chain 40 interconnects the idle sprocket 36 with the rear wheel sprocket 30. In this prior art construction, tension or slack of the first and second endless chains 38 and 40 does not change as the rear wheel 26 moves on an arc carried by the swing arm 18.

Referring now to FIGS. 3–6, a preferred embodiment of the novel motorcycle drive and brake system or power transmission and brake assembly of the present invention, is disclosed. Principal novel features of the power transmission and brake assembly of the present invention are the following. A brake member such as a brake disk 42 is incorporated in an idle sprocket and brake assembly 44, and a brake engaging device such as brake calipers 46 are fixedly connected directly or indirectly to a swing arm 18 to engage the brake disk 42 whenever a braking action is desired by an operator (not shown).

More particularly, the motorcycle 22 incorporating the preferred embodiment of the power transmission and brake assembly of the present invention includes a frame 20, an engine 17, a power transmission and clutch assembly 14, and an output shaft 16. A drive sprocket 12 is rotated by the output shaft 16 whenever the motorcycle 22 is in locomotion under the power of the engine 17.

The motorcycle 22 further includes a substantially fork shaped swing arm 18, which in the herein described preferred embodiment of the present invention is outboard mounted relative to the frame 20 on a swing arm pivot axle 24.

Figure 5:
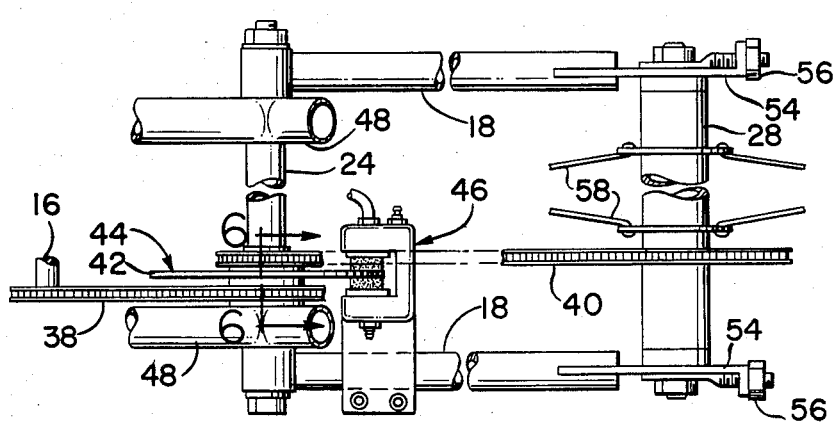
FIG. 5 is an enlarged top view of the preferred embodiment of the power transmission and brake assembly of the present invention, the view being taken on lines 5,5 of FIG. 3.

The outboard mounting of the swing arm 18 relative to the frame 20 is best shown on FIG. 5. The above noted outboard mounting of the swing arm 18 is preferable in the practice of the present invention because it renders possible the convenient positioning of the idle sprocket and brake assembly 44 on the swing arm pivot axle 24 between two members 48 of the frame 20.

Figure 3:
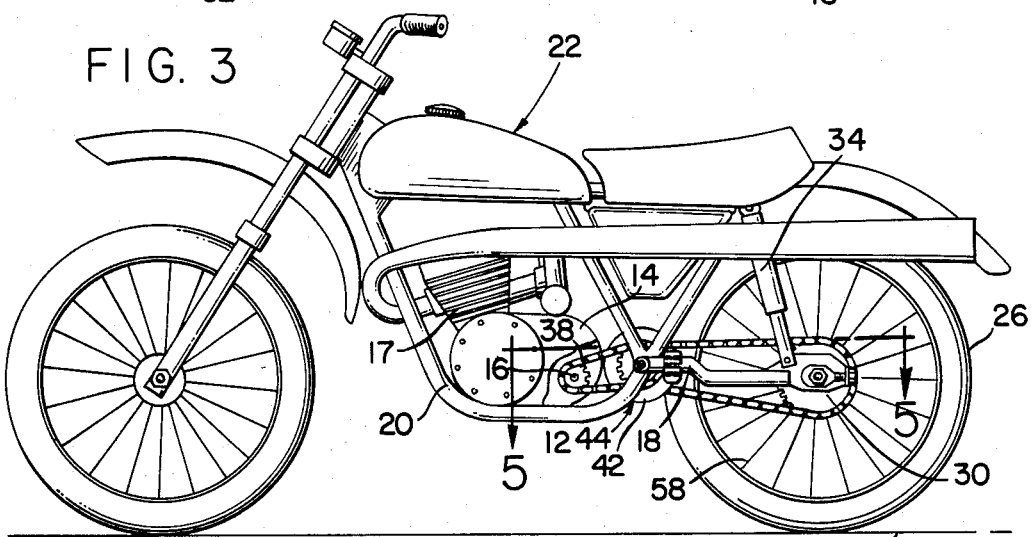
FIG. 3 is a schematic side view of a motorcycle incorporating a preferred embodiment of the power transmission and brake assembly of the present invention.
Figure 4:
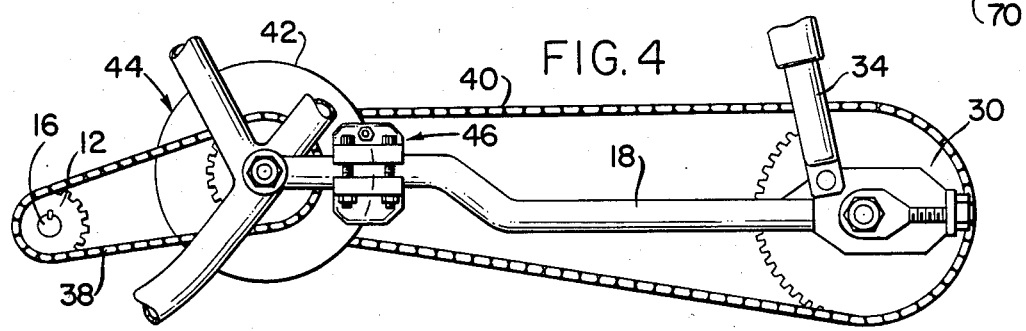
FIG. 4 is an enlarged side view of the preferred embodiment of the power transmission and brake assembly of the present invention.

Thus in accordance with the present invention, the idle sprocket and brake assembly 44 includes a first idle sprocket 50 and a second idle sprocket 52. The first and second idle sprockets 50 and 52 are both mounted on to and are rotatable about the swing arm pivot axle 24. They are respectively interconnected with the drive sprocket 12 and a rear wheel sprocket 30 by a first and second endless chain 38 and 40. The rear wheel sprocket 30 is fixedly attached to a rear wheel axle 28, and the rear wheel axle 28 is mounted, in accordance with established practice in the art, substantially at the end of the swing arm 18. Brackets and nuts for mounting the rear wheel axle 28 in the swing arm 18 are best shown on FIGS. 4 and 5, and respectively carry the reference numerals 54 and 56. FIGS. 3 and 5 also show spokes 58 of the rear wheel 26.

Figure 6:
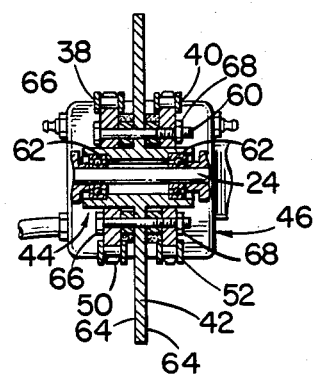
FIG. 6 is a view, partly in cross section, of the preferred embodiment of the power transmission and brake assembly of the present invention, the view being taken on lines 6,6 of FIG. 5.

Referring still to FIGS. 3-6 and more particularly to FIG. 6, mounting of a brake disk 42 between the first and second idle sprockets 50 and 52, is shown in detail. In the herein described preferred embodiment the brake disk 42 is integrally constructed with a bearing housing 60 which is placed as a sleeve on the swing arm pivot axle 24. The bearing housing 60 accommodates ball or roller bearings 62 between the housing 60 and the swing arm pivot axle 24. The brake disk 42 has exposed frictional surface 64 on its two sides, and the first and second idle sprockets 50 and 52 are fixedly attached by a plurality of bolts and nuts or the respective sides of the brake disk 42. The bolts and nuts attaching the idle sprockets 50 and 52 on the respective sides of the brake disk 42 are shown on FIG. 6, and respectively carry the reference numerals 66 and 68.

Mechanically, or preferably hydraulically actuated brake calipers 46 are constructed substantially in accordance with the standard practice in the art, are mounted to the swing arm 18 so as to be capable of gripping and frictionally engaging the brake disk 42.

It should be readily apparent from the foregoing description that the first and second idle sprockets 50 and 52 and the brake disk 42 rotate in unison with one another as the idle sprocket and brake assembly 44. Because the axis of rotation of the idle sprocket and brake assembly 44 coincides with the swing arm pivot axle 24, tension of the second endless chain 40 is unaffected by the irregular up-and-down movement of the rear wheel 26 on a bumpy road surface (not shown). The rear wheel 26 is braked, when braking is desired, through the idle sprocket and brake assembly 44 and the weight of the brake disk 42 is not unsprung. In fact, by eliminating a brake drum (not shown) or brake disk from the rear wheel 26, construction of the rear wheel 26 is greatly simplified. Because the brake disk 42 is not subjected to lateral stresses and dislocations of the kind experienced by a brake disk located on the rear wheel 26 (as is in the prior art) the brake calipers 46 require less frequent adjustment.

Furthermore, and perhaps most importantly, mounting the brake calipers 46 on the swing arm 18 results in a force which, during braking of the rear wheel 26, pushes the rear wheel 26 downward, towards the road surface 70. This, of course, is in sharp contrast with the prior art and results in increased traction between the rear wheel 26 and the road surface 70. Consequently, increased brake effectiveness as well as improved directional stability of the motorcycle 22 is attained during braking.

Thus, overall, the above-described power transmission and brake assembly construction results in improved handling and braking performance of the motorcycle 22, as well as in drastically improved chain wear, and in elimination of chain adjustment problems. It is emphasized with regard to the idle sprocket and brake assembly 44 that the foregoing specific description of the same should be considered examplary rather than limiting in nature. For example, mounting of the brake disk 42 between the first and second idle sprockets 50 and 52 is not critical for the purpose of practicing the present invention. What is important in this regard is that a rotating brake member, such as the brake disk 42, be mounted to rotate about the swing arm pivot axle 24 together with the idle sprockets, and that the idle sprockets respectively be connected with the drive sprocket 12 and the rear wheel sprocket 30.

Regarding the brake engaging device, such as the brake calipers 46, the following is noted. Although the brake calipers 46 are mounted on the swing arm 18, and therefore they move therewith on an arc, their movement is not significant. This is because the brake calipers 46 are mounted relatively close to the swing arm pivot axle 24. Experience has shown that the slight movement of the brake calipers 46 on the swing arm 18 does not affect their ability to grip and brake the brake disk 42. However, in order to avoid transmission of motion to a brake lever (not shown) hydraulically actuated brake calipers 46 are much preferred over brake calipers which would have mechanical linkages (not shown) to the brake pedal (not shown).

Still further, it is not important to directly mount the brake calipers 46 to the swing arm 18. In this regard it is sufficient to accomplish the purpose of the present invention by fixedly connecting the brake calipers 46 to the swing arm 18 directly or indirectly. In alternative embodiments, a rigid member or branch (not shown) of the swing arm 18 may bear the brake calipers 46.

Several modifications of the hereinbefore described motorcycle power transmission and brake assembly may become readily apparent to those skilled in the art in light of the above disclosure. The hereinbefore described power transmission and brake assembly may even be utilized in three wheeled, or other vehicles wherein a wheel or a pair of wheels is mounted on a swing arm and is driven by a chain. In light of the foregoing, the scope of the present invention should be determined solely from the following claims.

What is claimed is:

1. A power transmission and brake system for chain driven vehicles, the system comprising:
   a frame;
   an engine mounted to the frame;
   a rotatable drive sprocket operatively connected with the engine and being rotatable thereby;
   a swing arm mounted to the frame at a fixedly positioned swing arm pivot axle about which the swing arm is pivotable;
   a rear wheel rotatably mounted in the swing arm at a fixedly positioned rear wheel axle, whereby the rear wheel axle is capable of at least a limited travel on an arc relative to the frame;

a rear wheel sprocket fixedly mounted to the rear wheel and rotating about the rear wheel axle;

a first endless drive chain being in permanent engagement with the rear wheel sprocket;

an idle sprocket and brake assembly mounted to the axle of the swing arm pivot, the idle sprocket and brake assembly including first idle sprocket means for engaging the first drive chain, second idle sprocket means for engaging the second drive chain, and a brake member; the first idle sprocket means, the second idle sprocket means and the brake member being fixedly connected to one another for rotation in unison about the axle of the swing arm pivot, the brake member having a frictional surface, and brake means fixedly connected to the swing arm to move on an arc therewith, said brake means being actuable by an operator of the vehicle for engaging the frictional surface of the brake member and for transmitting a force from the brake member to the swing arm thereby braking the rear wheel of the vehicle through the idle sprocket and brake assembly and the second drive chain and resisting a tendency of the motorcycle to shift forwardly and to transfer weight to the front wheel when said motorcycle is braked, thereby improving traction of the rear wheel of the motorcycle relative to the road surface.

2. The invention of claim 1 wherein the brake member is a disk, and the brake means comprise caliper means for engaging the frictional surface of the disk.

3. The invention of claim 2 wherein the first idle sprocket means comprise a first sprocket fixedly mounted on a first side of the disk, and wherein the second idle sprocket means comprise a second sprocket fixedly mounted on a second side of the disk.

4. The invention of claim 2 wherein the first and second sprockets and the disk are fixedly mounted to one another by a plurality of bolts and nuts.

5. The invention of claim 3 wherein the disk is integrally constructed with a bearing housing, and wherein a bearing is mounted between the bearing housing and the swing arm pivot axle to render the idle sprocket assembly rotatable about the swing arm pivot axle.

6. A power transmission and brake system for a motorcycle having a frame, an engine mounted to the frame, and a transmission assembly mounted to the frame and operatively connected with the engine, the transmission assembly including a rotating output shaft, the motorcycle further having a swing arm mounted to a swing arm pivot axle fixedly positioned relative to the frame so that the swing arm is capable of at least limited pivoting movement relative to the frame, and a rear wheel rotatable about a rear wheel axle which is mounted to the swing arm, the system comprising:

a drive sprocket mounted to the output shaft to be rotated thereby;

an idle sprocket and brake assembly including a first and second sprocket and a brake member, the first and second sprockets and the brake member being fixedly mounted to one another and being mounted to be rotatable in unison about the swing arm pivot axle;

a rear wheel sprocket fixedly mounted to the rear wheel to be rotatable about the rear wheel axle;

a first endless drive chain engaging the drive sprocket and the first sprocket;

a second endless drive chain engaging the rear wheel sprocket and the second sprocket, and brake engaging means fixedly connected to the swing arm for frictionally engaging the brake member at the option of an operator of the motorcycle and for thereby exerting a force which resists forward tilting of the motorcycle and resists transfer of weight of the motorcycle to the front wheel thereof when the brake engaging means are operated, thereby increasing traction of the rear wheel of the motorcycle relative to the road surface.

7. The invention of claim 6 wherein the brake member is a brake disk.

8. The invention of claim 7 wherein the brake disk is mounted between the first and second sprockets.

9. The invention of claim 7 wherein the brake engaging means comprise caliper means for frictionally engaging two sides of the brake disk.

10. The invention of claim 9 wherein the system further includes a bearing housing integrally constructed with the brake disk, and a bearing incorporated between the bearing housing and the swing arm pivot axle.

11. The invention of claim 10 wherein the brake disk is mounted between the first and second sprockets.

12. The invention of claim 6 wherein the brake engaging means are hydraulically actuated.

13. The invention of claim 6 further including a member fixedly mounted to the swing arm, said member fixedly mounting the brake engaging means.

14. In a chain driven vehicle having a frame, a swing arm pivotably mounted relative to the frame on a swing arm pivot axle, a rear wheel mounted on a rear wheel axle positioned in the swing arm, the rear wheel including a rear wheel sprocket; a drive sprocket mounted to the frame and driven by an engine, an idle sprocket assembly mounted to be rotatable about the swing arm pivot axle, a first endless chain interconnecting the drive sprocket and the idle sprocket assembly, and a second endless chain interconnecting the rear wheel sprocket and the idle sprocket assembly, the improvement comprising:

a brake member incorporated in the idle sprocket assembly for rotation together with the idle sprocket assembly about the swing arm pivot axle, the brake member having at least one frictional surface, and brake engaging means fixedly connected to the swing arm for engaging the frictional surface of the brake member at the option of an operator of the vehicle whereby the rear wheel of the vehicle is braked through the idle sprocket assembly and the second endless chain, and whereby a force is transmitted from the brake engaging means through the swing arm to the vehicle which force resists forward tilting of the vehicle and resists transfer of weight of the vehicle to the front wheel thereof when the brake engaging means are operated, thereby increasing traction of the rear wheel of the vehicle relative to the road surface.

15. The improvement of claim 14 wherein the brake member is a brake disk.

16. The improvement of claim 15 wherein the idle sprocket assembly includes a first sprocket engaging the first endless chain, a secnd sprocket engaging the second endless chain, the first and second sprockets and the brake disk being fixedly mounted to one another.

17. The improvement of claim 15 wherein the brake disk is positioned between the first and second sprockets.

18. The improvement of claim 16 wherein the brake engaging means are hydraulically actuated.

* * * * *